Patented Nov. 9, 1926.

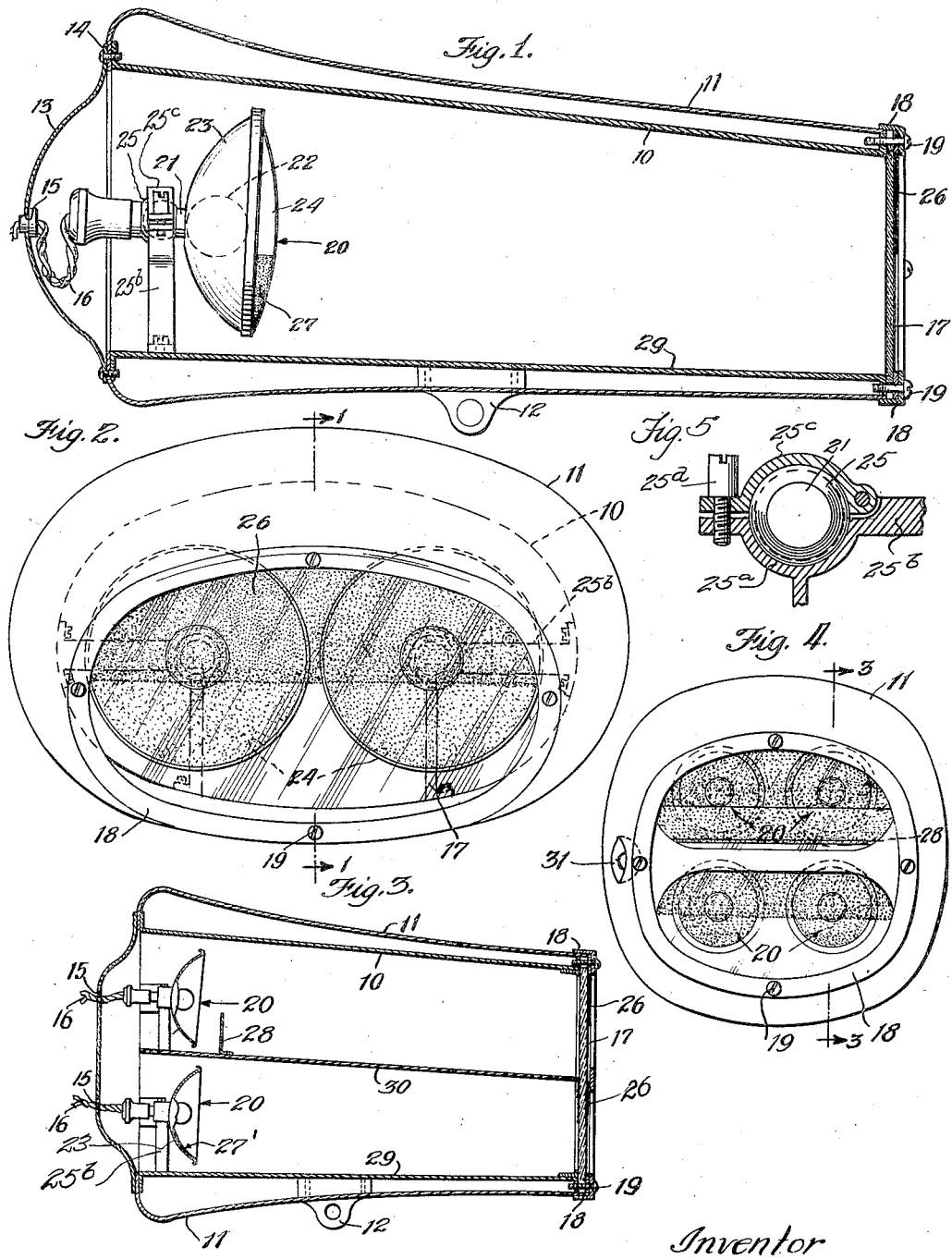

1,606,411

UNITED STATES PATENT OFFICE.

BERT G. GOBLE, OF TULSA, OKLAHOMA.

HEADLIGHT.

Application filed November 1, 1923. Serial No. 672,041.

The invention relates to light projecting apparatus, and has particular reference to headlights designed for use on motor vehicles and the like.

The primary object of the invention is to provide a headlight, the light rays from which are directed in and confined to a path below the horizontal plane of the headlight to illuminate certain chosen areas on the roadway, and which is of such construction and arrangement of parts that no part of the illuminated reflecting surface is visible to an approaching driver, whereby the objectionable glaring effect so prevalent in headlights heretofore provided is avoided.

A further object is to provide a headlight of the above character which will direct the light rays of greatest intensity to illuminate the roadway at a remote distance from the vehicle and will direct the light rays of lesser intensity to illuminate the roadway immediately ahead of the vehicle.

A more specific object consists in the provision of means in an electric headlight for directing a narrow beam of non-diffused light rays in a path inclined forwardly and downwardly with respect to the horizontal plane of the headlight to illuminate a remote portion of the roadway, and to project a portion of the direct light rays upon the roadway immediately ahead of the vehicle, said means being adjustable to direct said light rays to different lateral areas of the roadway.

A further object is to provide a headlight of the above character comprising means which is adjustable to vary the size of the reflected beam, and the lateral and vertical direction at which said beam is projected on the roadway.

Still another object is to provide a headlight having a plurality of adjustable lamps which can be independently positioned to illuminate different areas along or lateral of the roadway.

I accomplish the above objects by providing a headlight in which one or more adjustable lamps are mounted in the rear end of an elongated casing, said casing being slightly inclined downwardly and forwardly with respect to the horizontal; and in which the upper portion of the glass plate in the front end of the casing and the lower portion of the lens of each lamp are rendered opaque, whereby the illuminated reflector is screened from observation from a point above the horizontal plane of the light, and light rays are caused to stream through the lower transparent portion of the glass plate in a path below said horizontal plane to illuminate remote and immediate areas on the roadway, the lamps being selectively adjustable to vary the lateral direction of the projected beams.

Further objects and advantages will become apparent as the description proceeds.

In the accompanying drawings, Figure 1 is a vertical sectional view taken along the line 1—1 of Fig. 2 showing a device embodying the features of my invention. Fig. 2 is a front view of the device. Fig. 3 is a view similar to Fig. 1 of a modified form of the invention taken along line 3—3 of Fig. 4. Fig. 4 is a front view of the modification shown in Fig. 3. Fig. 5 is a sectional view of the supporting bracket for each lamp.

While my invention is susceptible of various modifications and alternative constructions, I have herein shown and will describe in detail the preferred embodiments, but it is to be understood that I do not thereby intend to limit the invention to the specific constructions disclosed, but aim in the appended claims to cover all legitimate modifications and alternative constructions falling within the spirit and scope of the invention.

In its exemplary embodiments, the invention comprises generally an elongated inner casing 10, and an outer housing 11 of substantially the same shape, which is suitably supported in any desired position on the vehicle body, as by means of a bracket 12. The rear end of the casing 10 is closed by a cover 13 which is secured to the housing 11 by any suitable means, such as screws 14, and which is formed with a plurality of apertures 15 through which extend electric lead wires 16 connected to the source of illumination. The forward end of the casing 10 is closed by a glass plate 17 which is conveniently held in position by a flange member 18 secured in place by screws 19. Preferably, the walls of the casing 10 and housing 11 are made elliptical in form, the top and bottom walls of each being slightly inclined forwardly and downwardly with respect to the horizontal. The cover 13 and plate 17 are however mounted in vertical position.

Any suitable source of illumination may be positioned within the inner end of the casing 10. In Fig. 1, I have shown two separately adjustable lamps 20, each of which comprises a socket 21 to which the cord 16 is attached, an electric bulb 22, a curved reflector 23, and an enclosing lens 24, but any other desired number of lamps may be employed. Each lamp is supported for universal adjustment. To this end the socket 21 is formed with a ball 25 which rests in a socket 25$^a$ formed in a bracket 25$^b$. The latter is formed with a pair of perpendicular arms which are secured to the side and bottom of the casing 10. A clamp 25$^c$ is hinged on the bracket 25$^b$ and engages the upper portion of the ball 25. The clamp may be secured in place by a suitable bolt 25$^d$. If desired, means extending outwardly through the cover 13 may be provided for conveniently adjusting the position of the lamps.

Means is provided for restricting the passage of a portion of the light rays from the casing 10 to avoid the objectionable glaring effect ordinarily produced by prior headlights on the drivers of approaching vehicles. In the present instance, an opaque substance 26 is applied to the upper portion of the glass plate 17 to restrict the passage of direct and reflected light rays upwardly from the horizontal plane of the lamp. The lower edge of the opaque substance 26 defines the upper limit of the reflected light rays which are projected upon the remote area of the roadway. An opaque substance 27 is likewise applied to the lower portion of some part of the lamp 20 to prevent the reflection of light waves upwardly from the lower portion of the reflector 23 into the eyes of an approaching driver. In Fig. 1 I have shown the opaque substance 27 applied to the lens 24 and in Fig. 3 to the reflector 23. The upper edge of the opaque substance 27 defines the lower limit of the beam of reflected light rays leaving the casing 10. If desired, any other suitable screening means, such as the angle iron 28, shown in Fig. 3, may be employed. The upper and lower edges respectively of the opaque substances 27 and 26 are so located that normally no portion of the illuminated reflector 23 is visible from any point above the horizontal plane passing through the axis of the lamp 20. To prevent light rays from being reflected upwardly from the inner surface 29 of the casing 10 into the eyes of an approaching driver, said surface is maintained substantially non-reflecting, as for example, by being kept in an oxidized or unpolished condition or by being coated with a material having a very low coefficient of light reflection.

From this construction it will be apparent that direct light rays from the bulb 22 will stream through the entire transparent portion of the plate 17 below the opaque substance 26 to illuminate that portion of the roadway immediately ahead of the vehicle, and that a beam of reflected light, the upper and lower limits of which are defined respectively by the lower and upper edges of the opaque substances 26 and 27 will pass through a central portion of the plate 17 to illuminate a remote area on the roadway. Since only the upper and lower segments of the spot of reflected light are cut off by the screening means, a relatively large portion of the spot is projected upon the roadway. By tilting the lamp 20 about a horizontal axis, the upper edge of the opaque substance 27 is lowered, whereby the amount of light intercepted by the screening means is reduced, and the direction in which reflected light is projected upon the roadway is lowered. By adjusting the lamp about a vertical axis, light may be directed to any desired lateral area on the highway.

The lower and upper edges respectively of the two screening means 26 and 27, may be adjusted to be substantially in the same horizontal plane. Because of the angular inclination of the lamp 20, a beam of reflected light from the central portion of the reflector 23 may still be directed to the roadway in a path slightly inclined downwardly and forwardly with respect to the horizontal plane of the bulb 22. All parts of the reflector 23 are screened from observation from a point above the plane of the headlight. Since in addition the surface 29 of the casing 10 is substantially non-reflecting, no intense rays of light will be directed upwardly from the headlight.

In Fig. 3, I have shown a headlight comprising four independently adjustable lamps 20. A horizontal partition 30 is mounted in the casing 10 between the upper and lower lamps. The glass plate 17 is coated with the opaque substance 26 in two areas adjacent the upper portion of each compartment formed by the partition 30. To provide means for illuminating the road at the side of the vehicle, I have provided a lamp 31 mounted in the side of the headlight for independent use.

It will be apparent that I have provided simple and efficient adjustable headlights adapted for a wide range of illumination which will be non-glaring to an approaching driver, and which will still provide ample illumination for the proper operation of the vehicle.

I claim as my invention:—

1. A headlight having, in combination, an elongated casing having its upper and lower walls slightly inclined downwardly and forwardly with respect to the horizontal, a glass vertically secured in the front end of said casing, a source of illumination mounted in the rear end of said casing for universal adjustment about two perpendicular axes, said source comprising a concave reflector, a light and an enclosing lens, an opaque substance applied to the upper portion of said glass and an opaque substance applied to the lower portion of said enclosing lens, whereby only a lateral strip of reflector surface remains effective to project a beam of non-diffused light, the upper and lower limits of which are defined by the lower and upper edges respectively of said opaque substances.

2. A headlight having, in combination, an elongated casing, the upper and lower walls of which are inclined downwardly and forwardly with respect to the horizontal and comprise substantially non-reflecting inner surfaces, a glass plate positioned in the front end of said casing, a cover enclosing the rear end of said casing, a pair of lamps mounted for independent universal adjustment in the rear end of said casing, shield means positioned to intercept light rays from passing through the upper portion of said glass plate, and means for preventing the passage of reflected light rays directly from the lower portions of said lamps through the lower portion of said plate.

3. A headlight having, in combination, a casing, a transparent plate positioned in the front end of said casing, two pairs of lamps mounted in the rear end of said casing, said lamps being independently adjustable, a partition mounted to separate said pairs of lamps, means for rendering portions of said transparent plate opaque to the passage of light, and means associated with each lamp for rendering its reflector in its lower portion ineffective to project reflected light rays from the casing, said two last mentioned means cooperating to define the upper and lower limits of each beam of reflected light.

4. A headlight having, in combination, an elongated casing, the upper and lower walls of which are slightly inclined downwardly and forwardly with respect to the horizontal, a partition substantially parallel to said walls mounted within said casing, a pair of lamps adjustably mounted in the rear end of said casing above the partition, a second pair of lamps adjustably mounted in the rear end of said casing below said partition, transparent means positioned in the front end of said casing above and below said partition, and shield means for defining the upper and lower limits of each beam of reflected light projected from said casing.

In testimony whereof, I have hereunto affixed my signature.

BERT G. GOBLE.